US008895886B2

(12) United States Patent
Lin et al.

(10) Patent No.: US 8,895,886 B2
(45) Date of Patent: Nov. 25, 2014

(54) CLADDING APPLICATION METHOD AND APPARATUS USING HYBRID LASER PROCESS

(75) Inventors: Dechao Lin, Greer, SC (US); Yan Cui, Greer, SC (US); Srikanth Chandrudu Kottilingam, Simpsonville, SC (US); David Edward Schick, Greenville, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 136 days.

(21) Appl. No.: 13/048,289

(22) Filed: Mar. 15, 2011

(65) Prior Publication Data

US 2012/0234798 A1   Sep. 20, 2012

(51) Int. Cl.
| | | |
|---|---|---|
| *B23K 9/18* | (2006.01) | |
| *B23K 26/14* | (2014.01) | |
| *B23K 26/34* | (2014.01) | |
| *B23K 26/32* | (2014.01) | |
| *B23K 9/04* | (2006.01) | |

(52) U.S. Cl.
CPC .......... *B23K 26/345* (2013.01); *B23K 26/1429* (2013.01); *B23K 26/34* (2013.01); *B23K 26/3206* (2013.01); *B23K 9/04* (2013.01)
USPC ..................... 219/73; 219/76.14; 219/121.64; 219/76.1; 219/76.15

(58) Field of Classification Search
USPC .................. 219/73, 74, 121.64, 121.66, 76.1, 219/76.14, 76.15, 76.16, 137 WM, 145.22
See application file for complete search history.

(56) References Cited

U.S. PATENT DOCUMENTS

| | | | |
|---|---|---|---|
| 5,985,056 A * | 11/1999 | McCay et al. ................ | 148/511 |
| 6,483,077 B1 | 11/2002 | Albright et al. | |
| 6,521,861 B2 * | 2/2003 | Jones et al. .............. | 219/121.64 |
| 8,093,531 B2 * | 1/2012 | Kocik et al. .............. | 219/121.64 |
| 8,242,410 B2 * | 8/2012 | Peters ....................... | 219/130.51 |
| 8,253,060 B2 * | 8/2012 | Nowak et al. ............ | 219/121.63 |
| 8,257,049 B2 * | 9/2012 | Yelistratov et al. ....... | 416/241 R |
| 8,278,587 B2 * | 10/2012 | Zhang et al. ............. | 219/121.45 |
| 2010/0032413 A1 * | 2/2010 | Brenner et al. ................. | 219/75 |
| 2011/0132878 A1 * | 6/2011 | Wang et al. ..................... | 219/74 |
| 2011/0253680 A1 * | 10/2011 | Clark et al. .................. | 219/76.1 |

* cited by examiner

*Primary Examiner* — Henry Yuen
*Assistant Examiner* — Amit K Singh
(74) *Attorney, Agent, or Firm* — Cantor Colburn LLP

(57) ABSTRACT

Disclosed is a method for affixing a metal cladding to a metal base. The method includes: heating the metal cladding and a surface of the metal base with a heating device to create a molten metal pool having molten metal cladding layered upon molten metal base material in the metal base; stabilizing a temperature gradient of the molten metal pool with a laser beam directed into the molten metal pool; and cooling the molten metal pool to affix solidified cladding to the metal base.

1 Claim, 14 Drawing Sheets

Cladding applied continuously with transitions between strips

Cladding applied in uni-directional strips

Cladding application start

Cladding application end

FIG. 25 View

CLADDING APPLICATION METHOD AND APPARATUS USING HYBRID LASER PROCESS

BACKGROUND OF THE INVENTION

The subject matter disclosed herein relates to joining a metal cladding to a metal substrate surface.

Cladding can be applied to a substrate for many reasons. In one or more types of cladding, the substrate is a metal and the cladding is a similar or dissimilar metal. Joining the metal cladding to the metal substrate typically requires melting the cladding and a surface of the metal substrate together to form a molten metal pool and allowing the pool to cool and solidify. The result of the cladding application process is that the metal cladding is firmly affixed to the metal substrate.

There are many variables involved in the cladding application process such as heat input, cladding width, and cladding deposition rate. In general, these variables must be kept within certain windows in order to prevent defects in the affixed cladding such as non-uniformity and pitting. Some of these variables may be at odds with each other. For example, increasing the cladding deposition rate typically requires a high heat input, which can lead to crack formation. Some of these defects, unfortunately, can require rework or scrapping. Hence, it would be well received in the cladding application art if the rate of cladding deposition could be increased without incurring defects in the affixed cladding.

BRIEF DESCRIPTION OF THE INVENTION

According to one aspect of the invention, a method for affixing a metal cladding to a metal base is disclosed. The method includes: heating the metal cladding and a surface of the metal base with a heating device to create a molten metal pool having molten metal cladding layered upon molten metal base material in the metal base; stabilizing a temperature gradient of the molten metal pool with a laser beam directed into the molten metal pool; and cooling the molten metal pool to affix solidified cladding to the metal base.

According to another aspect of the invention, an apparatus for applying a metal cladding to a metal base is disclosed. The apparatus includes a heating device configured to heat the cladding and a surface of the metal base to create a molten metal pool having molten metal cladding layered upon molten metal base material in the metal base; and a laser configured to direct a laser beam into the molten metal pool to stabilize a temperature gradient of the molten metal pool.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings, wherein like elements are numbered alike, in which:

The detailed description explains embodiments of the invention, together with advantages and features, by way of example with reference to the drawings.

DETAILED DESCRIPTION OF THE INVENTION

Disclosed are exemplary embodiments of techniques for joining a metal cladding to a metal substrate or base. The techniques enable a wider strip of cladding to be applied to the metal base at a cladding deposition rate that is faster than prior art methods and yet still provide a uniform cladding surface without an increase in defects.

The techniques, which include apparatus and method, call for joining the metal cladding to the metal base using a hybrid head for melting the metal cladding and the metal base. The hybrid head includes a heating device and a laser. The heating device such as one used for welding is used to melt the cladding and a surface of the metal base to create a molten metal pool on the surface of the metal base. In the molten metal pool, the melted cladding is layered upon melted base material. The laser produces a laser beam that is directed into the molten metal pool to stabilize the temperature of the molten metal. The laser beam has sufficient power to stabilize the temperature gradient (i.e., reduce variations in temperature) around the laser beam. Stabilized temperature of the molten metal pool enables the rate of deposition of the cladding to be increased over prior art cladding processes and still provides a uniform cladding surface upon solidifying. In addition, the temperature gradient stabilization provides for a wider clad layer than the prior art cladding processes.

Advantages of the hybrid head over prior art welding techniques for applying cladding include less distortion and less dilution of the cladding with the metal base as a result of the depth of penetration of the molten metal pool.

The techniques provide various arrangements of the heating device and the laser within the hybrid head as well as various paths that may be used to deposit the cladding on the base.

Figure 1:
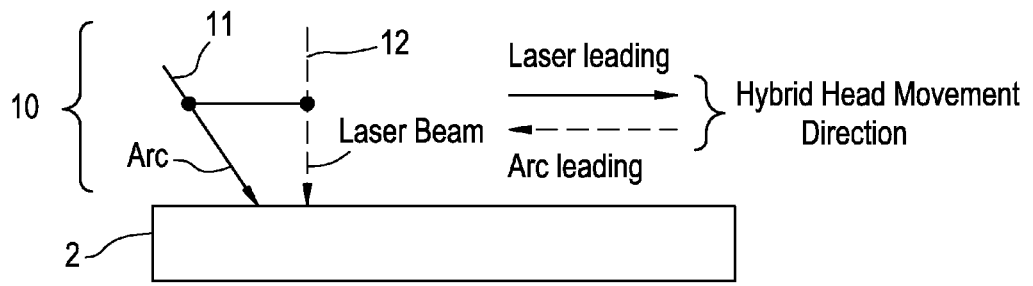
FIGS. 1 and 2 illustrate an exemplary embodiment of a hybrid laser head having a heating device and a laser for joining metal cladding to a metal base.
Figure 2:
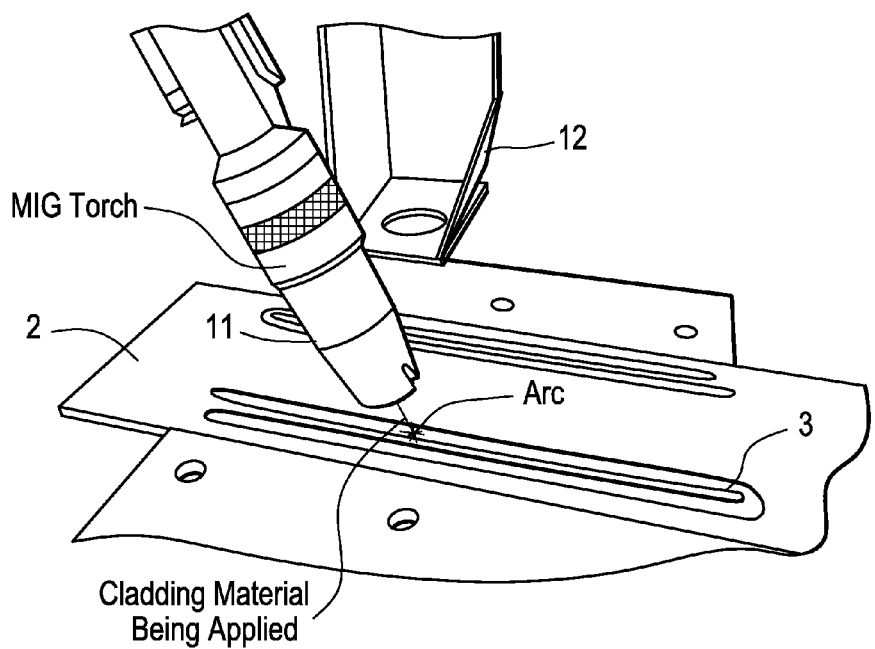

Reference may now be had to FIG. 1, which illustrates an exemplary embodiment of a hybrid cladding-application head 10 referred to as the hybrid head 10. A simplified representation of the hybrid head 10 is shown in FIG. 1 with a metal base 2 while a drawing of a prototype hybrid head 10 is shown in FIG. 2 with the metal base 2 and metal cladding 3. The hybrid head 10 includes a heating device 11 and a laser 12. In one or more embodiments, the heating device 11 is a welding-type torch head. Non-limiting embodiments of the welding-type torch head include torch heads for gas tungsten arc welding (GTAW) also referred to as tungsten inert gas (TIG) welding, gas metal arc welding (GMAW) also referred to as metal inert gas (MIG) welding or metal active gas welding (MAG), submerged arc welding (SAW), plasma arc welding (PAW), and flux core arc welding (FCAW). With the welding-type torch heads, the cladding is generally supplied in the form of a wire, which is melted with the arc that creates the molten metal pool. In one or more embodiments, the laser 12 is an industrial laser having sufficient power to limit the temperature gradient across the molten metal pool created by the heating device 11, but not over-powering such that the laser beam will not create a keyhole into the metal base 2 deeper than the depth of the molten metal pool. In one or more embodiments, the laser 12 has sufficient power to maintain the surface area of the molten metal pool while the metal cladding 3 is being deposited on the metal base 2 at a selected rate. It can be appreciated that the speed of the cladding deposition and size and temperature of the molten metal pool are just some factors that can be used to determine the required power output of the laser 12. Non-limiting embodiments of the laser 12 include a Nd:YAG laser, a $CO_2$ laser, a disk laser, a fibre laser, or any type of laser resonator of sufficient power to stabilize the temperature gradient of the molten metal pool. Referring to FIG. 1, the laser 12 can be oriented to lead the heating device 11 in depositing the cladding 3 on the metal base 2. Alternatively, the heating device 11 can be oriented to lead the laser 12 in the cladding application process.

Figure 3:
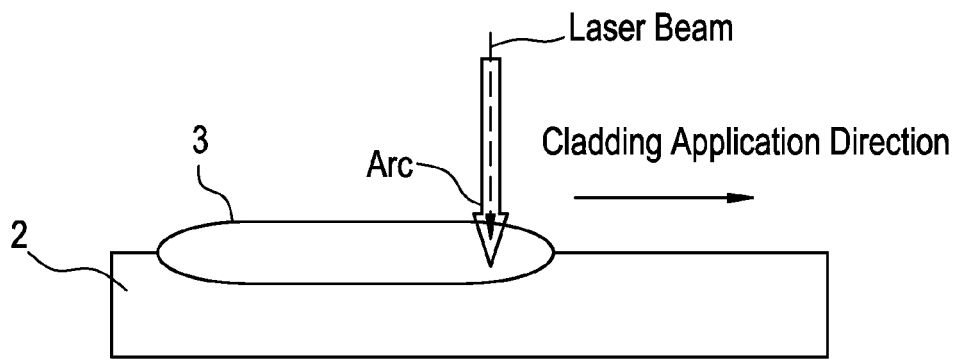
FIGS. 3-5 depict aspects of joining the cladding to the metal base with a laser beam and arc torch aligned to a same plane perpendicular to a direction of applying the cladding.
Figure 4:
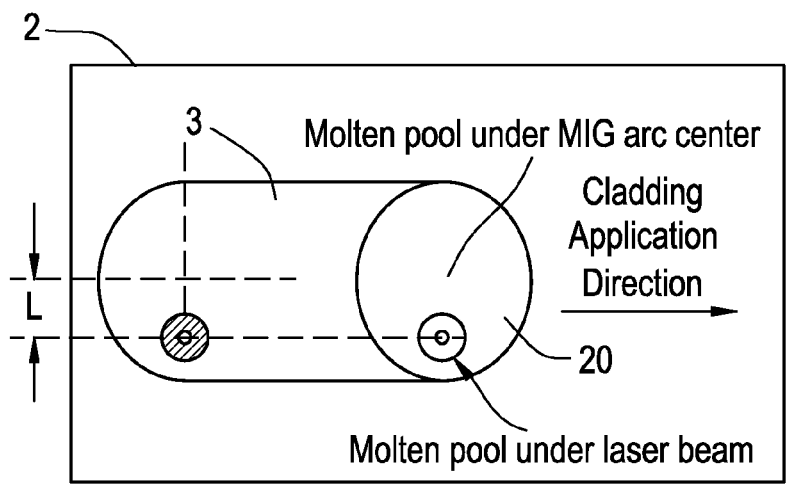
Figure 5:
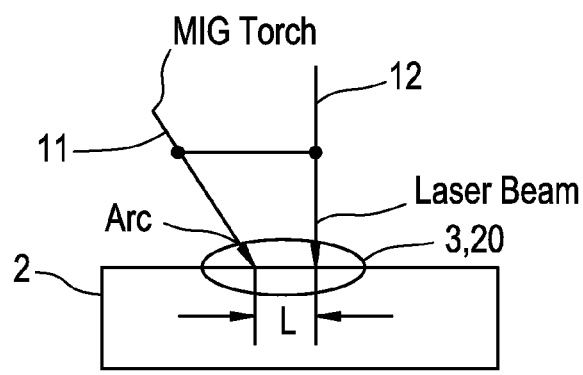

Reference may now be had to FIGS. 3-5, which illustrate a laser beam from the laser 12 and an arc from the heating device 11 aligned to a same plane perpendicular to the direction of cladding application. It can be appreciated that during the cladding application process the metal base 2 can be moved with respect to the hybrid head 10 or the hybrid head 10 can be moved with respect to the metal base 2. FIG. 3 illustrates a side view of the laser beam aligned with the arc. FIG. 4 illustrates a bird view of the laser beam and the arc over a molten metal pool 20. The laser beam is laterally offset a distance L from the arc. FIG. 5 illustrates a side view of the laser beam and the arc. In FIG. 5, the direction of cladding application is towards the viewer.

Figure 6:
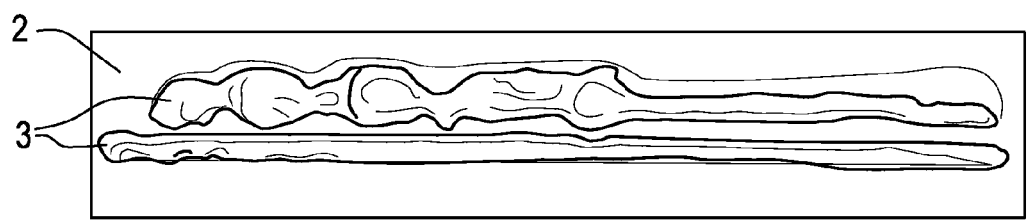
FIGS. 6-9 depict aspects of cladding joined to the metal base using techniques disclosed in FIG. 2.
Figure 7:
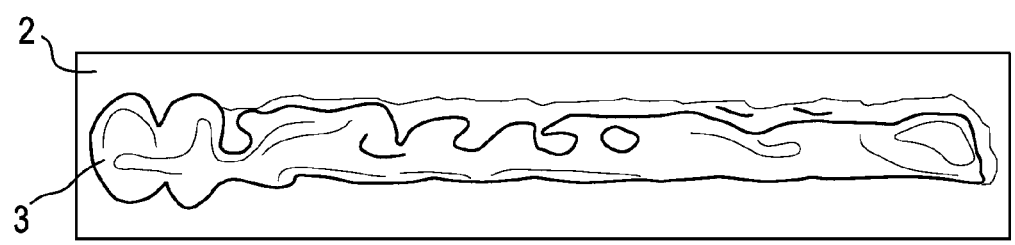
Figure 8:
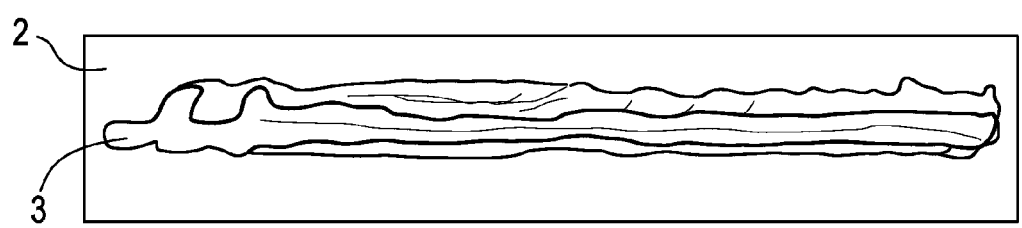
Figure 9:
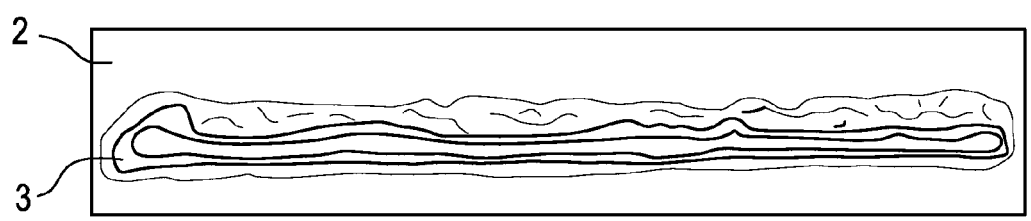

Reference may now be had to FIGS. 6-9, which illustrate results of cladding application using the embodiment disclosed in FIGS. 3-5 with different offsets L between the laser beam and the arc. The power of the laser 12 was two kilowatts. The heating device 11 was a MIG welding torch with settings of 300 inches per minute feed of cladding material to the torch and 25V in the voltage setting. The speed of application of the cladding 3 to the base 2 was forty inches per minute. Gas used by the MIG torch was Ar+2% $O_2$. The metal base 2 was 304 stainless steel and the metal cladding 3 was 308 stainless steel. In FIG. 6, the spacing L was 5.0 mm. Two separate beads of the cladding 3 were obtained. No interaction occurred between the MIG torch arc and the laser beam resulting in a first molten metal pool under the laser beam and a second molten metal pool under the MIG torch arc. A uniform cladding bead under the laser beam was obtained while the cladding bead under the MIG torch arc exhibits clumps. In FIG. 7, the spacing L was 4.0 mm and one cladding bead was obtained, but with clumps of the cladding 3. In FIG. 8, the spacing L was 2.5 mm and one cladding bead was obtained with less clumps of the cladding 3 than when L was 4.0 mm. In FIG. 9, the spacing L was 1.0 mm and the resulting cladding bead had a uniform surface on the laser beam side of the cladding beam, which indicates that the laser beam aligned with the arc only in the lateral direction cannot produce a uniform clad surface.

Figure 10:
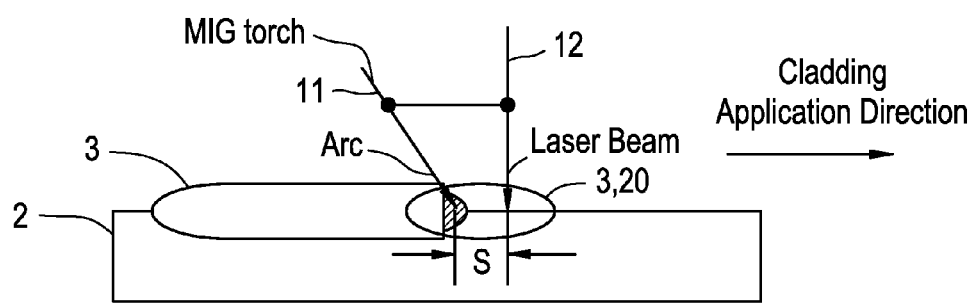
FIGS. 10 and 11 illustrate an embodiment with the laser beam from the laser aligned with an arc from the heating device in a plane that is aligned in the direction of the cladding application.
Figure 11:
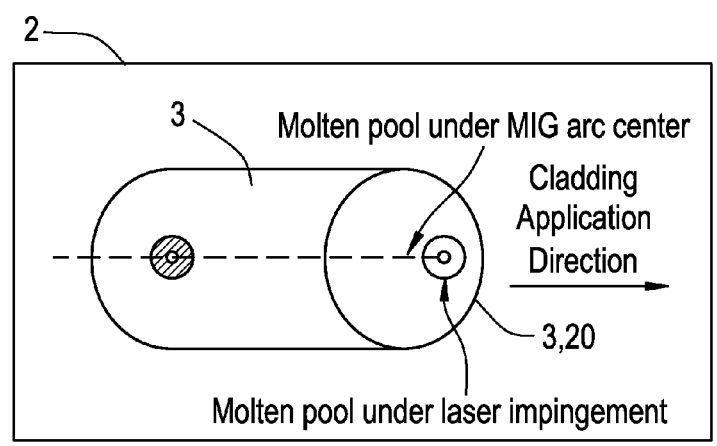

Reference may now be had to FIGS. 10 and 11, which illustrate an embodiment with the laser beam from the laser 12 aligned with the arc from the heating device 11 in a plane that is aligned in the direction of the cladding application. In the embodiment of FIGS. 10 and 11, the laser 12 is leading the heating device 11 in the direction of the cladding application. FIG. 10 illustrates a side view where the laser beam leads the arc by a longitudinal distance S. FIG. 11 illustrates a bird view showing the laser beam impinging on the molten meal pool 20 created by the MIG torch arc.

Figure 12:
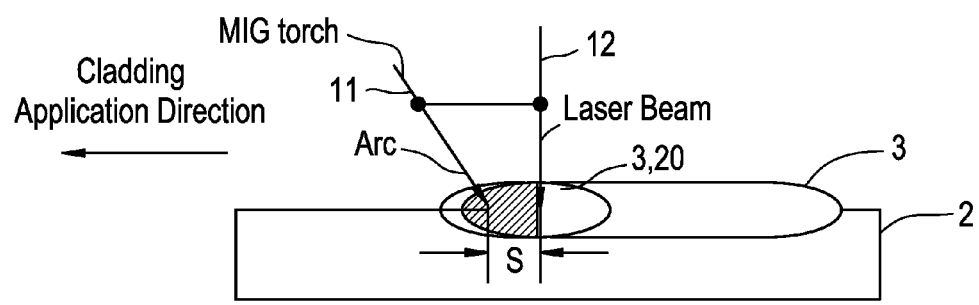
FIGS. 12 and 13 illustrate an embodiment with the arc from the heating device leading the laser beam from the laser in the direction of the cladding application.
Figure 13:
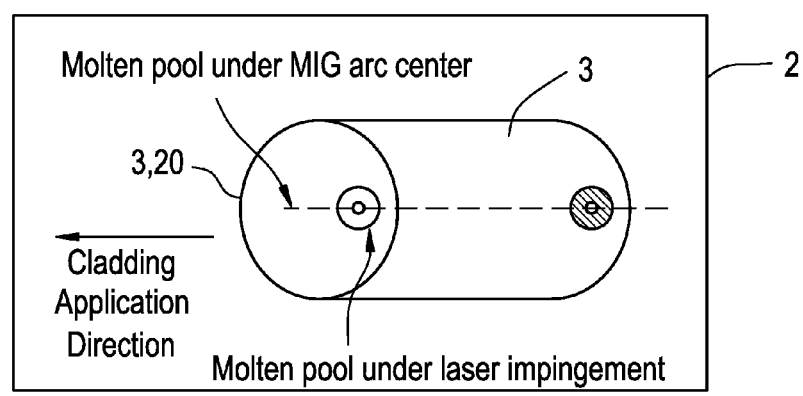

Reference may now be had to FIGS. 12 and 13, which illustrate an embodiment similar to the embodiment depicted in FIGS. 10 and 11 but with the arc from the heating device 11 leading the laser beam from the laser 12 in the direction of the cladding application. FIG. 12 illustrates a side view while FIG. 5B illustrates a bird view.

Figure 14:
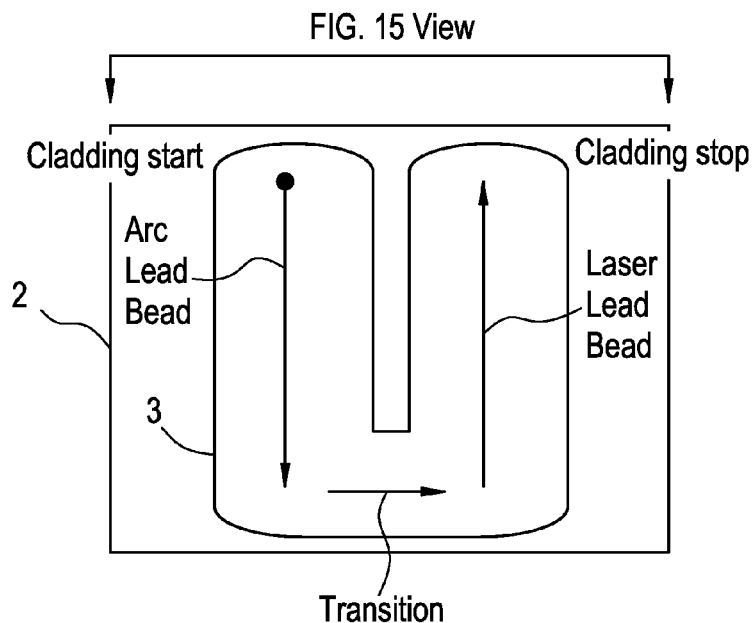
FIGS. 14-16 illustrate a continuous application of the cladding to the metal base in a U-shape path.
Figure 15:
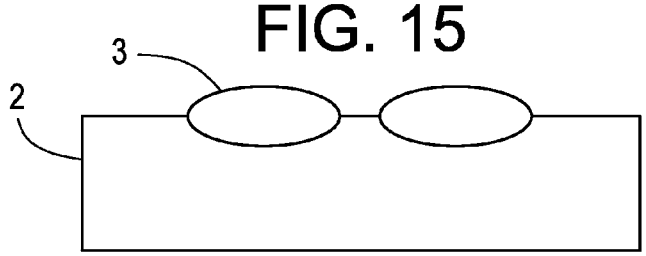
Figure 16:
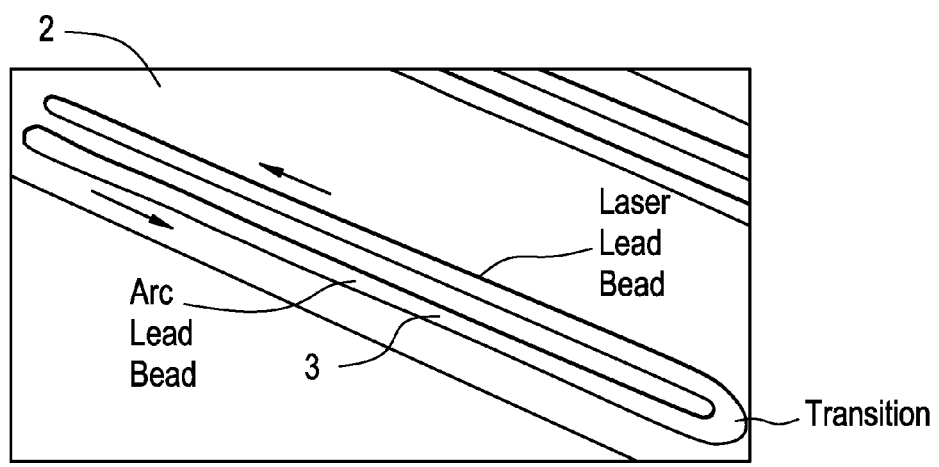

Reference may now be had to FIGS. 12 and 13, which illustrate a continuous application of the metal cladding 3 to the metal base 2 in a U-shape path, which could demonstrate two cases (laser leading and arc leading) mentioned above. FIG. 14 illustrates a bird view of the U-shape path of the hybrid laser head movement while FIG. 15 illustrates a side view of that path. FIG. 16 illustrates the result of applying the cladding 3 in the U-shape path with the laser beam leading in one leg of the path and the arc leading in the other leg of the path. The result shows the surface of the applied cladding to be uniform in both legs and in the U-transition between the legs. In the embodiment of FIGS. 14-16, the laser power was two kilowatts, the MIG torch setting was 300 inches per minute feed of cladding material and 25 V in the voltage setting, the speed of applying the cladding on the metal base was 40 inches per minute, the MIG gas was Ar+2% $O_2$, the metal base 2 was 304 stainless steel, and the cladding 3 was 308 stainless steel.

Figure 17:
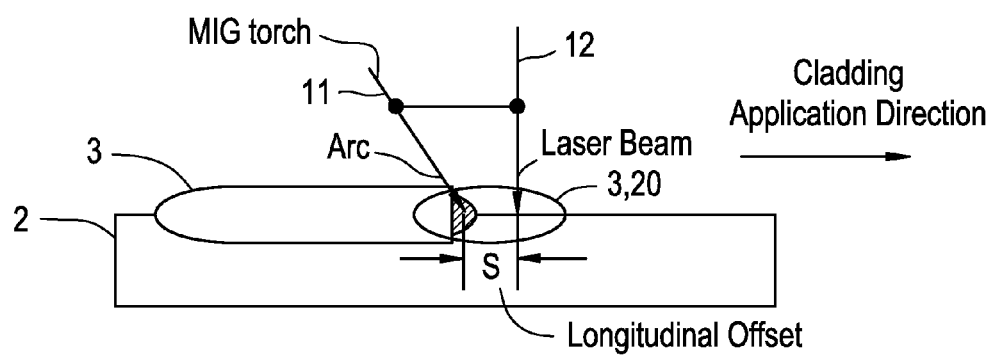
FIGS. 17 and 18 illustrate an embodiment of the hybrid head where the laser beam leads the arc and is laterally offset from the arc with respect to the direction of the cladding application.
Figure 18:
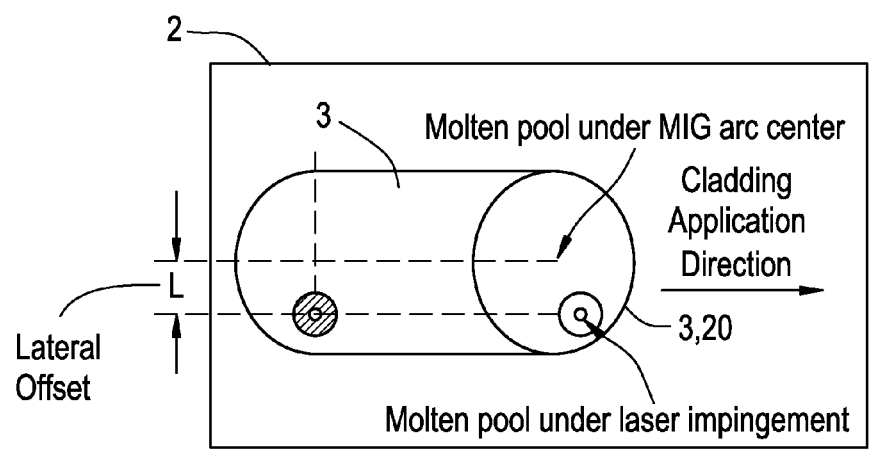

Reference may now be had to FIGS. 17 and 18, which illustrate an embodiment of the hybrid head 10 where the laser beam longitudinally leads the MIG arc and is laterally offset from the MIG arc with respect to the direction of the cladding application. In FIGS. 17 and 18, the laser beam leads the MIG arc by the longitudinal distance S and is laterally offset by the distance L. FIG. 17 illustrates a side view while FIG. 18 illustrates a bird view.

Figure 19:
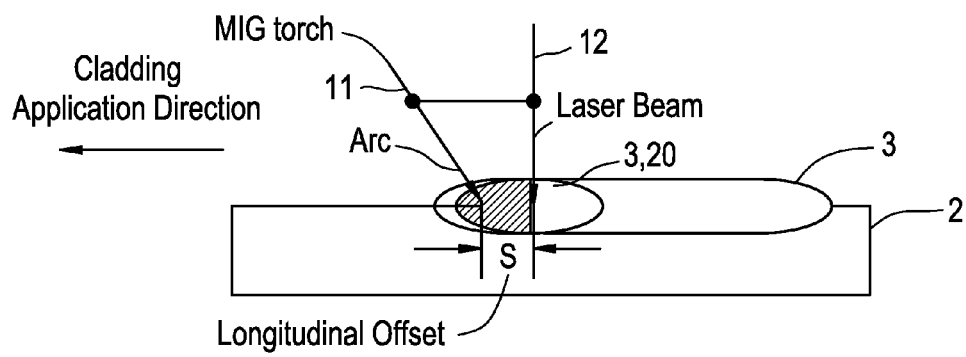
FIGS. 19 and 20 illustrate an embodiment of the hybrid head where the arc leads the laser beam and the laser beam is laterally offset from the arc with respect to the direction of the cladding application.
Figure 20:
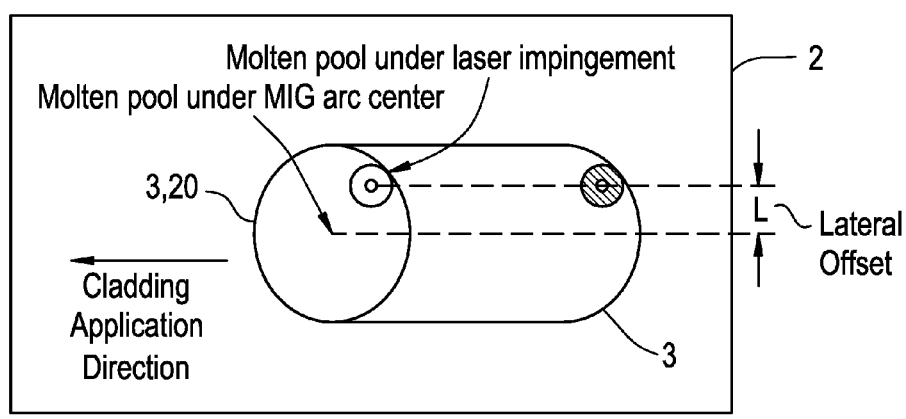

Reference may now be had to FIGS. 19 and 20, which illustrate an embodiment similar to the embodiment depicted in FIGS. 17 and 18 but with the arc from the heating device 11 leading the laser beam from the laser 12 in the direction of the cladding application. FIG. 19 illustrates a side view while FIG. 20 illustrates a bird view.

Figure 21:
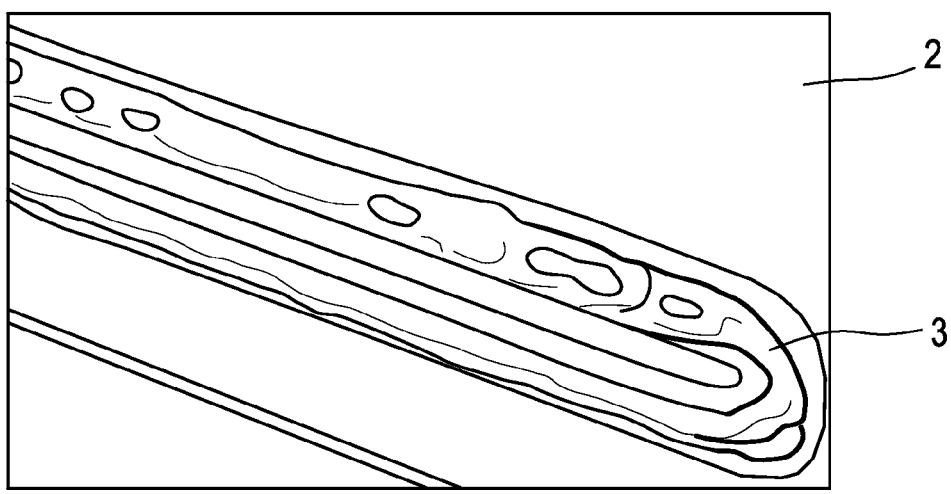
FIGS. 21 and 22 illustrate results of continuous cladding application using the hybrid head with the laser beam leading and lagging the arc and being laterally offset from the arc with respect to the direction of the cladding application.
Figure 22:
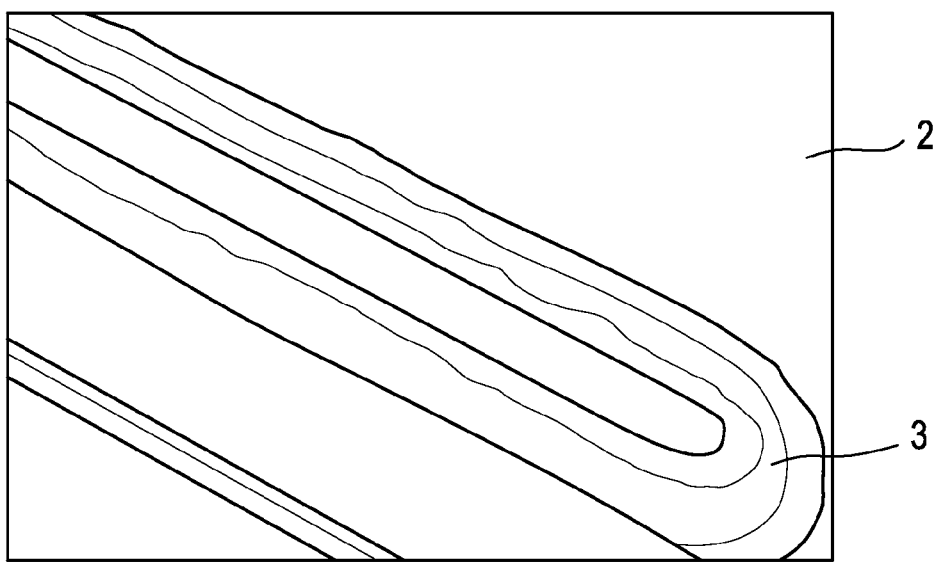

Reference may now be had to FIGS. 21 and 22, which illustrate results of continuous cladding application using the hybrid head 10 shown in FIGS. 17-20 with a constant longitudinal spacing S of 2.5 mm. The applied cladding shown in FIG. 21 was applied with the hybrid head 10 having a lateral offset L of 4.5 mm. The applied cladding in FIG. 21 exhibits pitting. The applied cladding shown in FIG. 22 was applied with the hybrid head having a lateral offset L of 2.5 mm. The applied cladding in FIG. 22 exhibits a uniform surface without the pitting shown in FIG. 21. The continuous applied cladding shown in each of FIGS. 21 and 22 was applied with the laser beam leading the arc in one leg of the U-shape path and the arc leading the laser beam in the other leg of the path.

The applied cladding shown in FIGS. 16 and 21-22 was applied in a U-shape path. It can be appreciated that the metal cladding 3 can be applied to the metal base 2 using other path shapes in which the laser beam may be leading or lagging the arc. In one or more embodiments, the path shape includes parallel legs with ninety-degree transitions between the legs. In one or more embodiments, the longitudinal distance S between the laser beam and the arc may be zero while the hybrid head 10 applies the cladding 3 in straight parallel legs of the path with the laser beam leading or lagging the arc in the transition between the legs. It can be appreciated that the hybrid head 10 can be configured to maintain a constant geometry of the laser beam and the arc with respect to the direction of cladding application through straight legs and/or through curves. It can also be appreciated that the cladding 3 can be applied to a pipe using the hybrid head 10. To apply the cladding 3 to a pipe, the hybrid head 10 can be configured to maintain a constant linear movement while the pipe simultaneously rotates at a constant rate so that the cladding metal can be built up on the outside diameter of the pipe.

Figure 23:
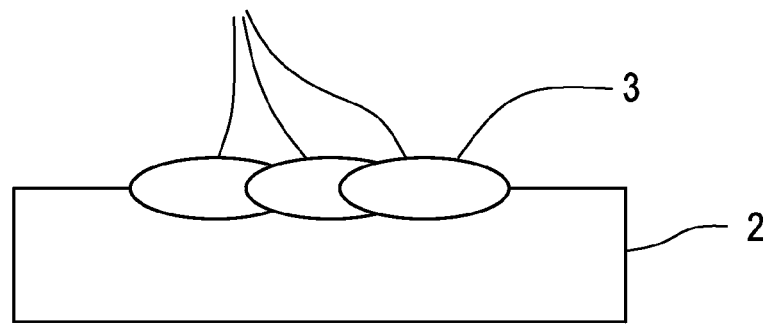
FIGS. 23 and 24 illustrate a zig-zag path for continuously applying the metal cladding on to the metal base.
Figure 24:
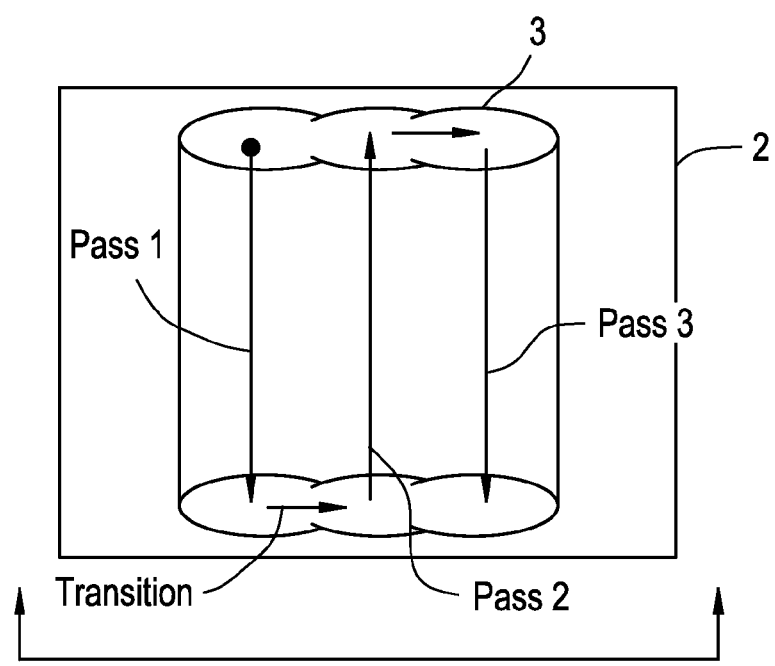

FIGS. 23 and 24 illustrate a zig-zag path for applying the metal cladding 3 on the metal base 2. FIG. 23 illustrates a side view while FIG. 24 illustrates a bird view. With the zig-zag path, the cladding 3 can be applied non-stop on the metal base 2.

Figure 25:
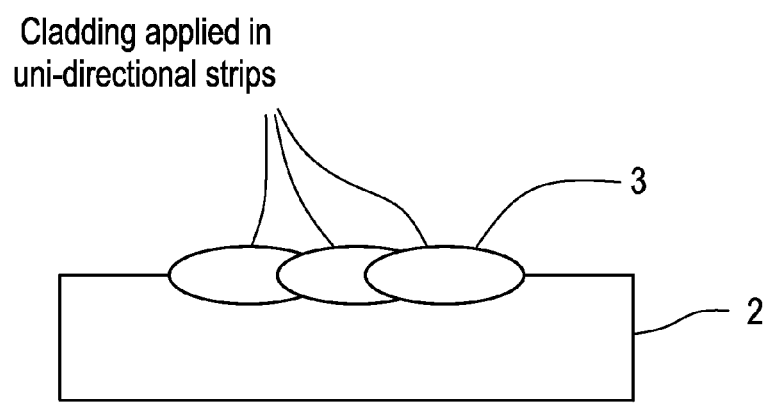
FIGS. 25 and 26 illustrate non-continuously applying the metal cladding to the metal base in a plurality of one-direction paths.
Figure 26:
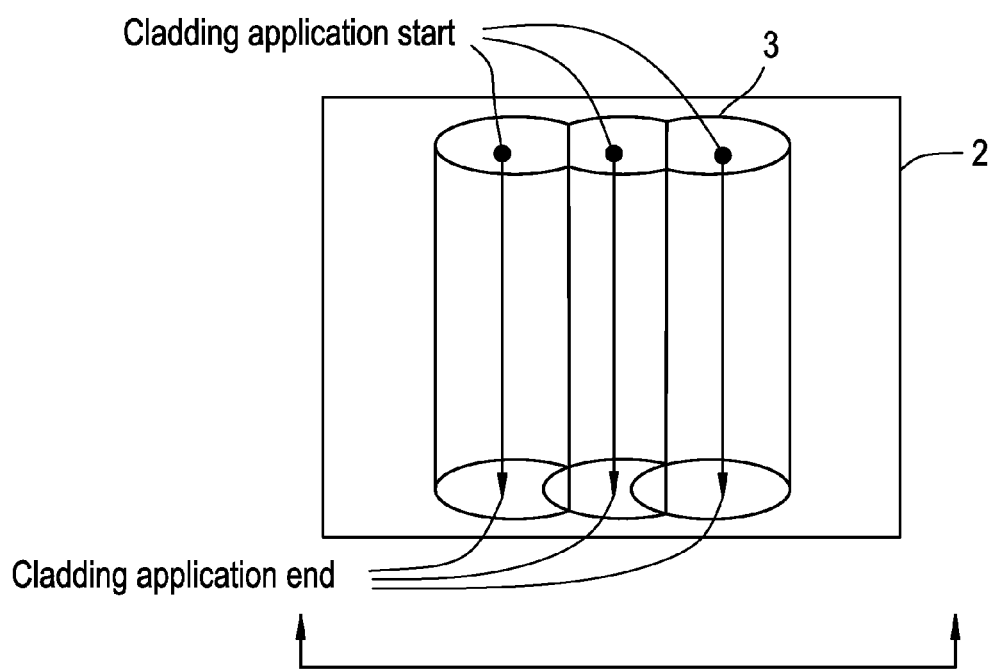

FIGS. 25 and 26 illustrate a plurality of one-direction paths for applying the metal cladding 3 on the metal base 2. FIG. 25 illustrates a side view while FIG. 26 illustrates a bird view. The plurality of one-direction paths requires frequent starts and stops of cladding application.

Figure 27:
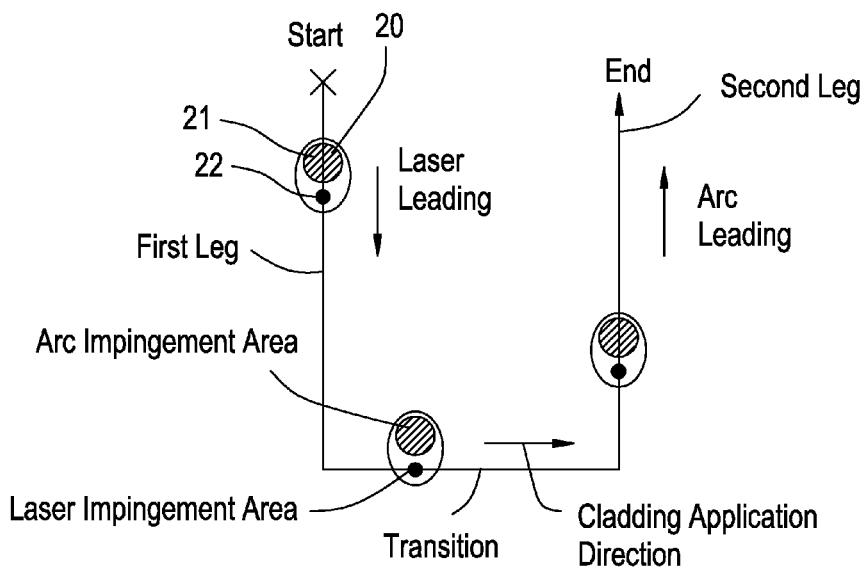
FIGS. 27 and 28 illustrate two geometries of the arc and laser beam for applying the metal cladding to the metal base.
Figure 28:
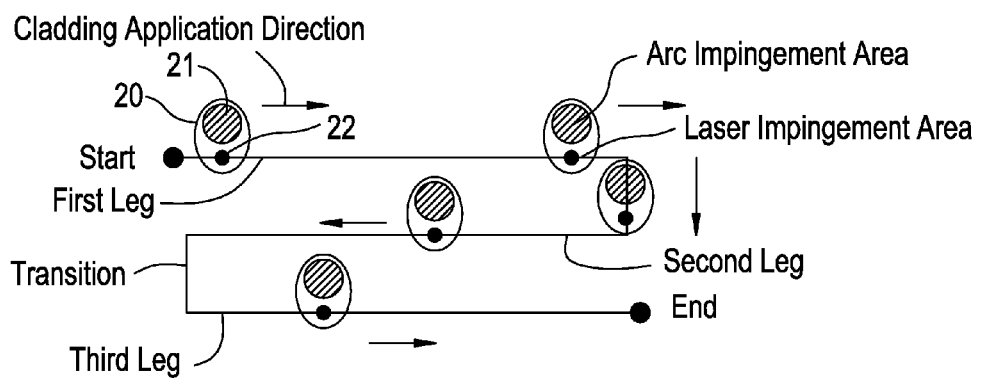

FIGS. 27 and 28 illustrate embodiments where the geometry of the hybrid head 10 remains fixed with respect to the metal base 2. The result of this fixed geometry is that the geometry of the impingement area of the arc (illustrated at 21) and the impingement area of the laser beam (illustrated at 22) remain fixed with respect to the metal base 2. In FIG. 27, the laser beam leads the arc in the first leg while the arc leads the laser beam in the second leg. In the transition, the longitudinal offset between the arc and the laser beam is zero. In FIG. 28, the longitudinal offset between the arc and the laser beam is zero in the first, second and third legs while the laser beam leads the arc in the transitions. It can be appreciated that the hybrid head 10 can be configured to swivel or rotate with respect to the metal base 2 in order for the geometry of the hybrid head 10 to remain fixed with respect to the direction of cladding application (i.e., with respect to each of the legs and transitions).

Figure 29:
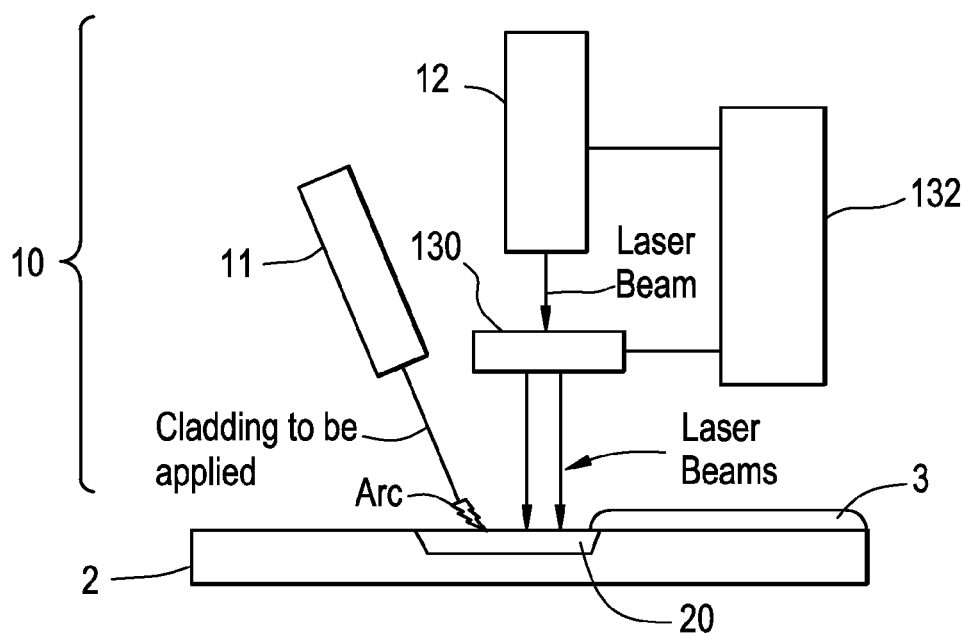
FIG. 29 illustrates an exemplary embodiment of a beam splitter and a controller coupled to the laser.
Figure 30:
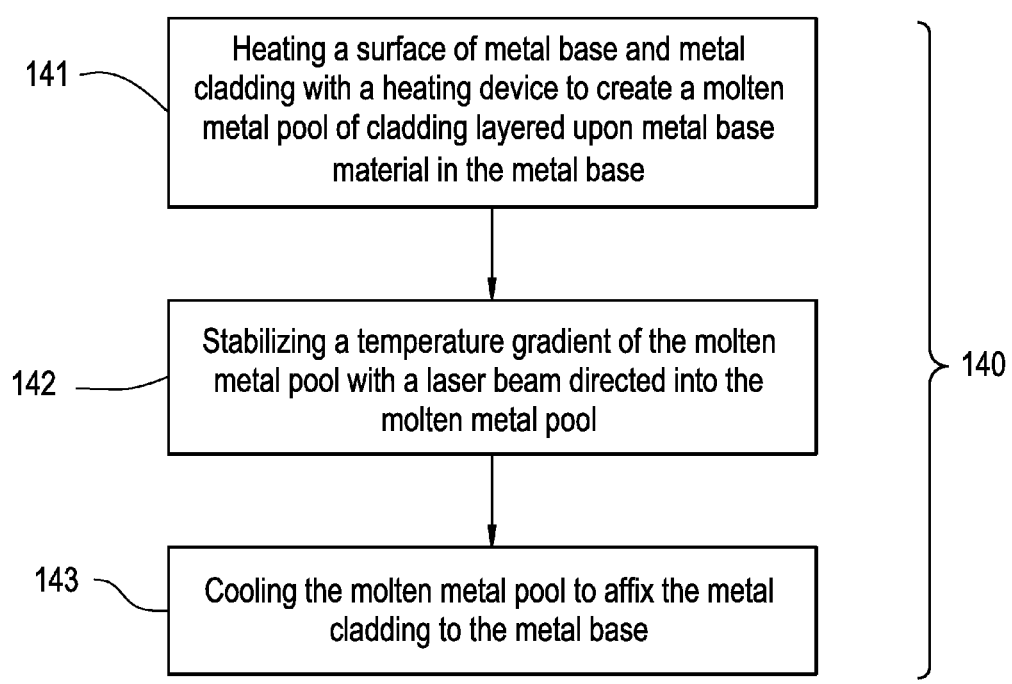
FIG. 30 presents one example of a method for applying metal cladding to a metal base.

It was shown above that using a laser beam of sufficient power that impinges on the molten metal pool 20 will stabilize the temperature gradient of the pool 20 to enable increasing the rate of application of the metal cladding 3 on the metal base 2 and to enable increasing the width of cladding application with respect to prior art cladding application processes. It can be appreciated that multiple laser beams can be used to impinge on various areas of the molten metal pool 20 to improve limiting the temperature gradient. The multiple beams can be derived from splitting a laser beam emitted from one laser or from using a plurality of lasers. It can be appreciated that the laser 12 can be configured to oscillate so that the laser beam impinges on the various areas of the molten metal pool 20. FIG. 29 illustrates an exemplary embodiment of a beam splitter 130 optically coupled to the laser 12 and configured to split the laser beam emitted from the laser 12 into two or more laser beams that impinge on the molten metal pool 20. In addition, FIG. 29 illustrates an exemplary embodiment of a controller 132 coupled to the laser 12. The controller includes components, such as electronics, sensors, and servos, that are configured to oscillate the laser 12 and the emitted laser beam on various areas of the molten metal pool 20.

FIG. 14 presents one example of a method 140 for affixing metal cladding to a metal base. The method 140 calls for (step 141) heating a surface of the metal base and the metal cladding with a heating device to create a molten metal pool of cladding layered upon metal base material in the metal base. Further, the method 140 calls for (step 142) stabilizing a temperature gradient of the molten metal pool with a laser beam directed into the molten metal pool. Step 142 can include having the laser beam offset to the arc of heating device laterally and/or longitudinally. Further, the method 140 calls for (step 143) cooling the molten metal pool to affix solidified cladding to the metal base.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to one component being coupled either directly to another component or indirectly to the another component via one or more intermediate components.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for affixing a metal cladding to a metal base, the method comprising:
   feeding metal cladding in wire form to a heating device that establishes an arc;
   heating the metal cladding to be applied and a surface of the metal base with the arc to create an open molten metal pool having molten metal cladding layered upon molten metal base material in the metal base, wherein a molten surface of the open molten metal pool is open to an environment above the surface of the metal base without another material on a side opposite a side the metal base is located at being in contact with the molten surface except for a cladding material source;
   stabilizing a temperature gradient of the molten metal pool by directing a laser beam into the molten metal pool to reduce variations in temperature around the laser beam, the laser beam having an impingement area in the molten metal pool that is offset from an impingement area of the arc in the molten metal pool;

cooling the molten metal pool to affix the metal cladding to the metal base;

providing the arc by one or more of the following processes: gas tungsten arc welding (GTAW), gas metal arc welding (GMAW), submerged arc welding (SAW), plasma arc welding (PAW), and flux-cored arc welding (FCAW);

shielding the arc from a surrounding atmosphere by a gas;

offsetting the laser beam longitudinally a distance S from the arc in a direction parallel to a direction of application of the metal cladding;

offsetting the laser beam laterally from the arc a distance L in a direction perpendicular to the direction of application of the metal cladding;

providing the laser beam by at least one of a Nd:YAG laser, a $CO_2$ laser, a disk laser, a fibre laser, and any type of laser resonator of sufficient power to stabilize the temperature gradient of the molten metal pool by reducing variations in temperature around the laser beam;

oscillating an impingement area of the laser beam within the molten metal pool;

directing multiple laser beams into different areas the molten metal pool for the stabilizing;

maintaining a constant surface area of the molten metal pool with the laser beam as the metal cladding is being applied to the molten metal pool; and emitting the laser beam from a laser that is not overpowering such that the laser beam will not create a keyhole into the metal base deeper than a depth of the molten metal pool.

* * * * *